Jan. 4, 1966  O. VON ZELEWSKY ETAL  3,226,768
CLOSING ARRANGEMENT, ESPECIALLY FOR NOZZLES
OF INJECTION MOLDING MACHINES
Filed April 1, 1963 7 Sheets-Sheet 1

INVENTORS:
Ottomar von Zelewsky
Werner Burkert

INVENTORS:
Ottomar von Zelewsky
Werner Burkert

INVENTORS:
Ottomar von Zelewsky
Werner Burkert

Jan. 4, 1966  O. VON ZELEWSKY ETAL  3,226,768
CLOSING ARRANGEMENT, ESPECIALLY FOR NOZZLES
OF INJECTION MOLDING MACHINES
Filed April 1, 1963  7 Sheets-Sheet 5

INVENTORS:
Ottomar von Zelewsky
Werner Burkert

United States Patent Office 3,226,768
Patented Jan. 4, 1966

3,226,768
CLOSING ARRANGEMENT, ESPECIALLY FOR NOZZLES OF INJECTION MOLDING MACHINES
Ottomar von Zelewsky, Neuhausen am Rheinfall, and Werner Burkert, Schaffhausen, Switzerland, assignors to Georg Fischer Aktiengesellschaft, Schaffhausen, Switzerland
Filed Apr. 1, 1963, Ser. No. 269,357
Claims priority, application Switzerland, Apr. 5, 1962, 4,199/62
10 Claims. (Cl. 18—30)

The present invention relates to a closing arrangement, especially for nozzles of injection molding machines. Spring-biased valves heretofore employed in connection with injection molding machines produce a good seal but require a rather high opening pressure. Such valves due to the lack of smooth passages contain corners in which the material may stagnate and disintegrate. When employing such valves, between the valve and the nozzle opening plugs form which in particular during the start of the injection molding are obstructed. Furthermore, such valves require a precise fit inasmuch as the full injection molding pressure acts upon the sealing surfaces.

Therefore, efforts have been made to carry out the closure on injection molding machines by means of slide closures. While such slide closures have a smooth flow and have good sealing properties, and while no opening pressure is required for opening the same, they have the darwback that they require a special control. Moreover, in the slide between the slide and the nozzle opening a cold plug forms which, similar to the spring-biased valve, makes difficult the start of the injection molding. These sliding closures require a precise fit because also in this instance the sealing surfaces are subjected to the full injection molding pressure.

It is, therefore, an object of the present invention to provide a closing arrangement for the purpose outlined above, which will overcome the above mentioned drawbacks.

It is another object of this invention to provide a closing arrangement especially for nozzles of the injection molding machines, which while assuring a smooth flow will not require any opening pressure nor a particular control and which will also avoid the formation of plugs between the closure and the pressure opening.

It is also an object of this invention to provide a closing arrangement as set forth in the preceding paragraph, which does not require a particularly precise fit.

These and other objects and advantages of the invention will appear more clearly from the following speification in connection with the accompanying drawings, in which:

FIG. 3b illustrates a further modification of a closing arrangement having four closing elements, pairs of which are identical.

Figure 1:
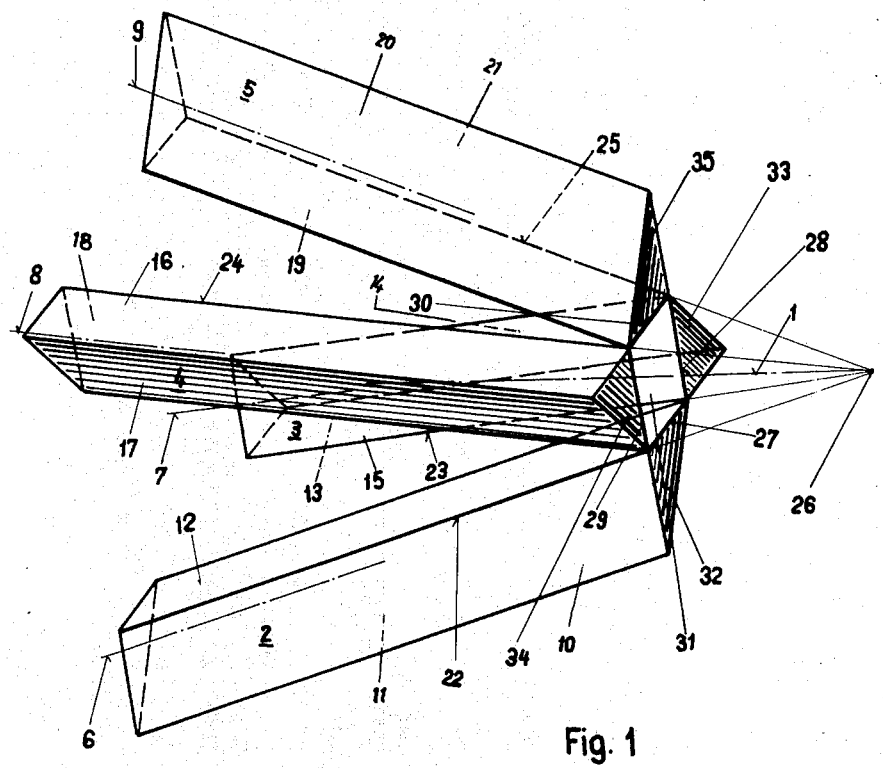
FIG. 1 is a perspective view of movable closing elements of a closing arrangement according to the invention with the closing arrangement in open condition.

FIGS. 5 to 10 diagrammatically illustrate a portion of an injection molding machine and respectively show the closing arrangement in different phases of operation.

FIGS. 11 to 14 show a modification of the arrangement of FIGS. 5 to 10 with an additional clamping ring.

The closing arrangement according to the present invention is characterized primarily in that at least three closing members are provided each of which has at least one rectilinear edge confined by two confining surfaces, said closing members being displaceable in a housing in the direction of said rectilinear edges. The arrangement is such that at least three of the extensions of said rectilinear edges intersect in a point and that the surfaces forming said edges are each parallel to one of the corresponding adjacent planes of the respective adjacent closing member and practically coincide with each other so that during the actuation of the arrangement the said surfaces are at least temporarily superimposed upon each other.

In a housing (not illustrated) of a closing device with a central axis 1 there are slidably arranged a plurality of closing members in form of prisms 2, 3, 4 and 5 with the prism axes 6 to 9 and the prism planes 10 to 21. The prisms 2 to 5 are displaceable in the direction of their axes 6 to 9. The prism edges 22 to 25 which are determined by two prism planes each, are likewise parallel to the prism edges 6 to 9. The extensions of said prism edges 22 to 25 intersect in a point 26, which when looking in the direction in which the injection is effected, is located in front of a nozzle opening 31. This nozzle opening is confined by closure edges 27 to 30.

Triangular closing surfaces 32 to 35 of the closing prisms 2 to 5 are located in a common plane with the nozzle opening 31.

Figure 2:
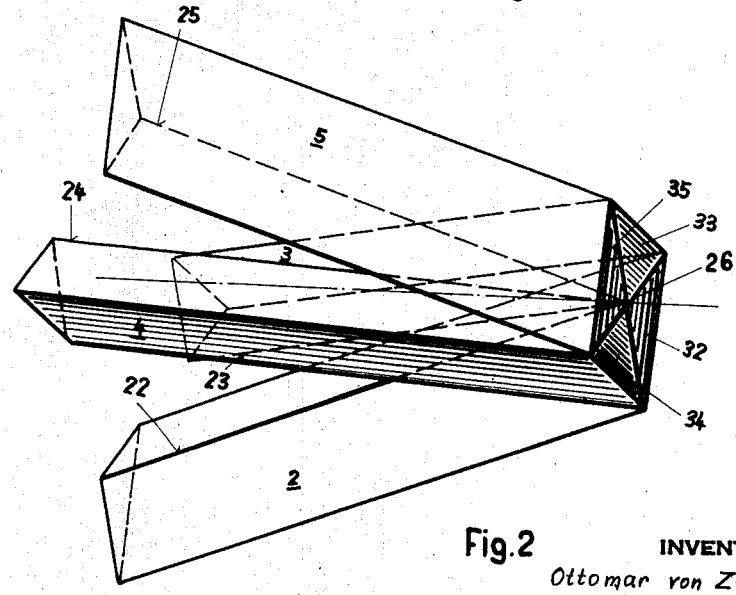
FIG. 2 illustrates the members of FIG. 1 in closing position.

If the closing arrangement, which is shown in open position in FIG. 1 is to be brought into closed position according to FIGURE 2, the prisms 2 to 5 are simultaneously moved in the direction of their axes 6 to 9 toward the point of intersection 26 until the closing surfaces 32 to 35 form a closed figure and there is no longer any nozzle opening. In order to make possible this moving-together of the prisms 2 to 5, it is necessary that those surfaces which define the prism edges 22 to 25 intersecting at their extensions, are in pairs parallel to each other in such a way that they will be able to slide upon each other in a practically play-free manner when the closing prisms 2 to 5 are displaced. In this instance, with regard to FIGS. 1 and 2, the prism surfaces 10 and 18, 16 and 19, 15 and 21, and 12 and 13 would be involved.

When employing three, five or more closing members, it is possible to obtain a nozzle opening of polygonal contour while the cooperation of the closing members will be realized in the above-mentioned manner.

Figure 3:
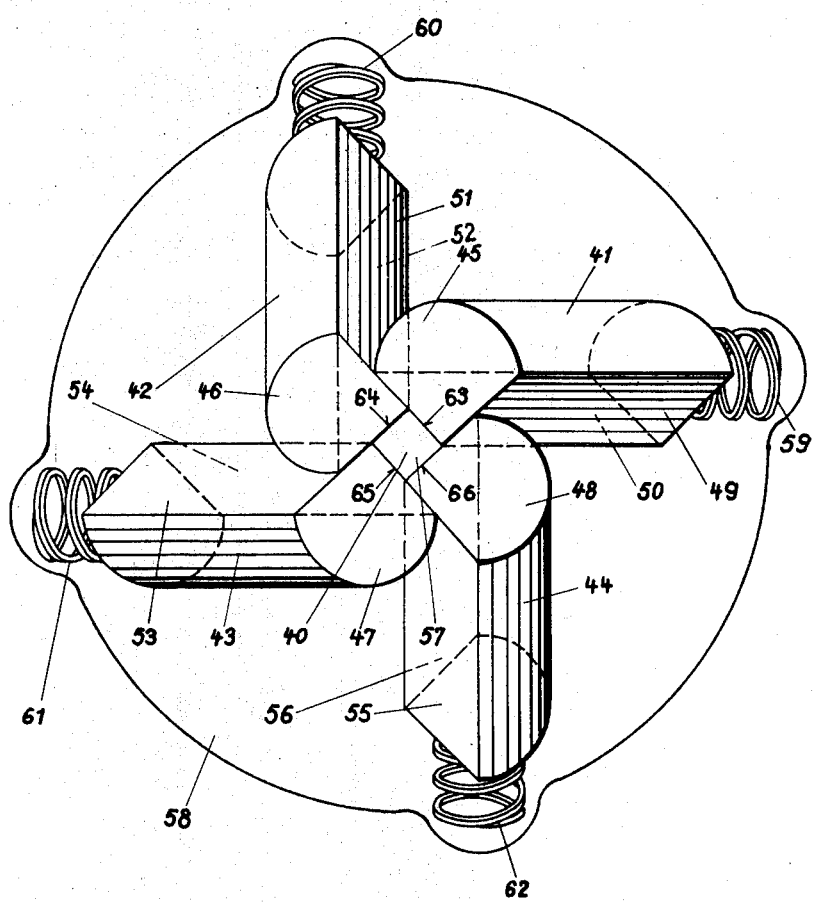
FIG. 3 is a diagrammatic illustration similar to that of FIG. 1 of a modified closing arrangement.
Figure 3A:
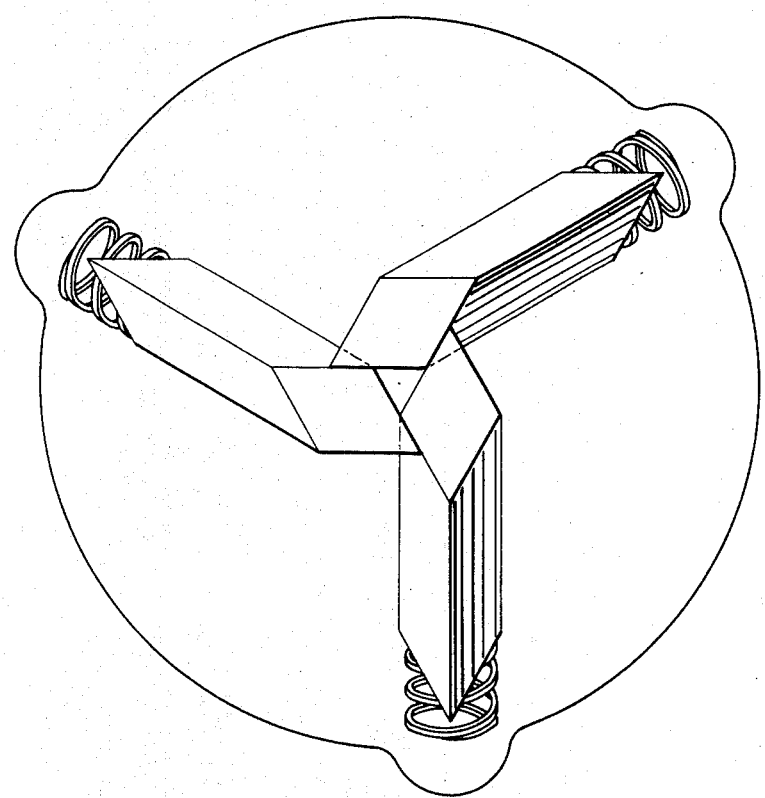
FIG. 3a shows schematically a modification of a closing arrangement having three closing elements.
Figure 3:
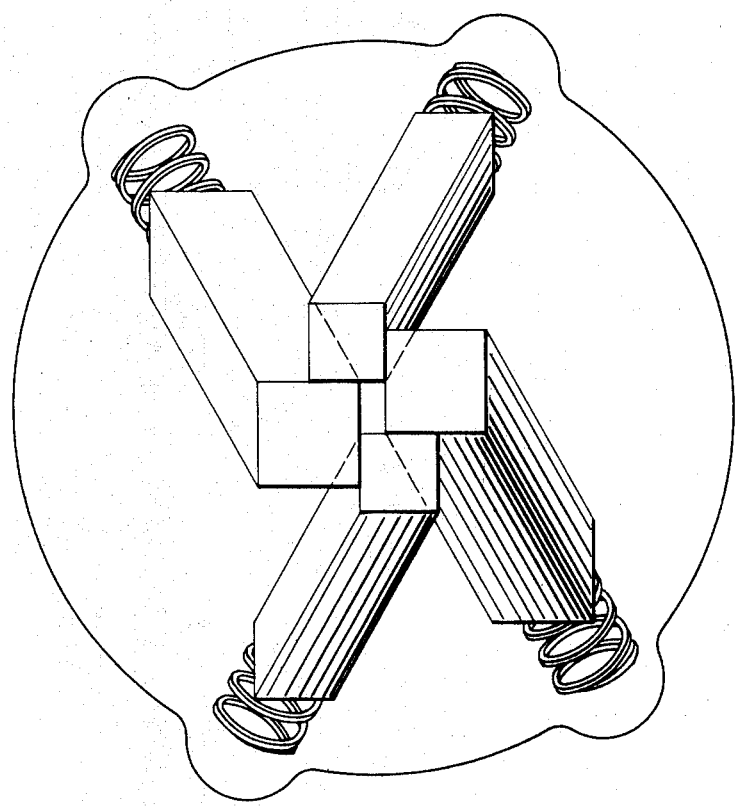
Figure 4:
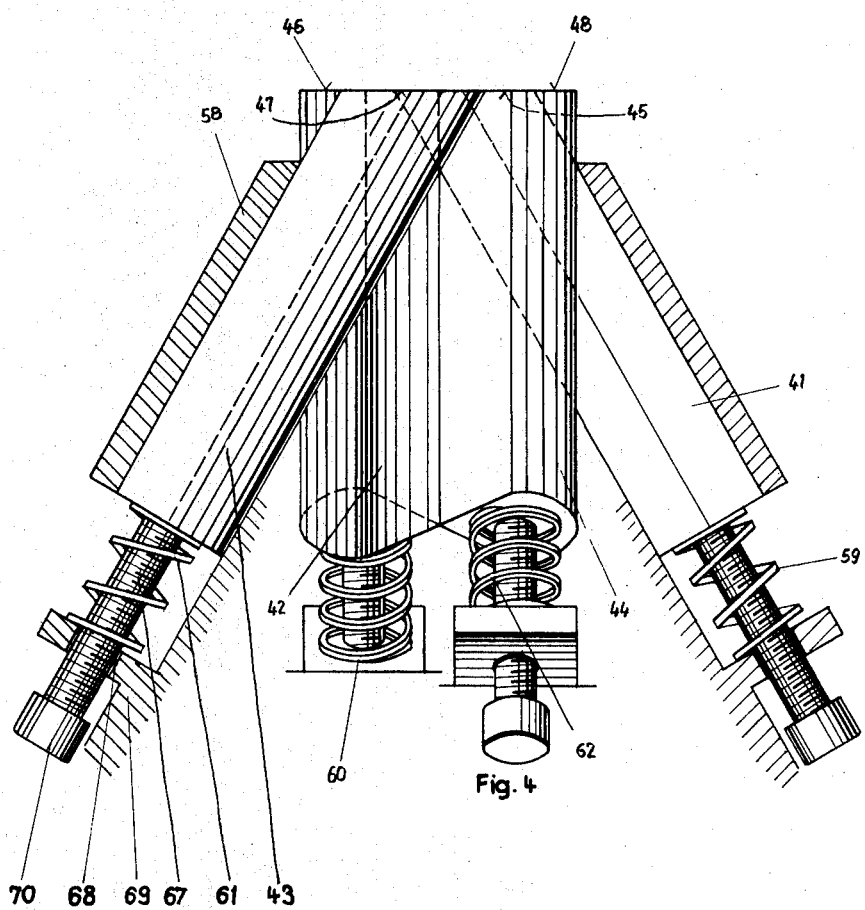
FIG. 4 is a side view of the closing arrangement according to FIG. 3.

FIGS. 3 and 4 illustrate an arrangement according to which a nozzle body 58 has a central axis 40. The closing members 41 to 44 are of a circular sector shaped cross-section, as clearly shown in FIG. 3. The front closing surfaces 45 to 48 of the closing members 41 to 44 are always located in a plane, in other words, not only when in closing position but in any position including the opened position. Each closing member 41 to 44 has a pair of surfaces 49, 50; 51, 52; 53, 54; and 55, 56. Each surface pair confines a prism edge. The thus formed nozzle opening 57 is in this instance square-shaped. FIG. 3 shows the closing device in open position.

The closing members 41 to 44 are, at that end of the closing device which is remote from the nozzle opening, provided with adjusting screws 67 (FIG. 4) with a head 70 serving as abutment. These adjusting screws 67 extend through an opening 68 of the nozzle body 58 or a flange ring 69. Springs 59 to 62 respectively rest on the rear surfaces of the closing members 41 to 44 and the flange rings 69. These springs continuously urge the closing members 41 to 44 into closing position.

FIG. 5 to 10 diagrammatically illustrate portions of an injection mold 75 and a closing device 80. The injection mold 75 has a front surface 76 and an injection channel 77. The closing device 80 is equipped with four closing members which, by spring means (not illustrated) are urged in a direction toward the injection mold. FIGS. 5 to 10 show only the two closing members 81 and 82. A feeding worm 84 has its worm tip 85 extending into a housing part 83 with a nozzle opening 87 and an end face 88 of the closing device 80.

Figures 5, 6, 7:
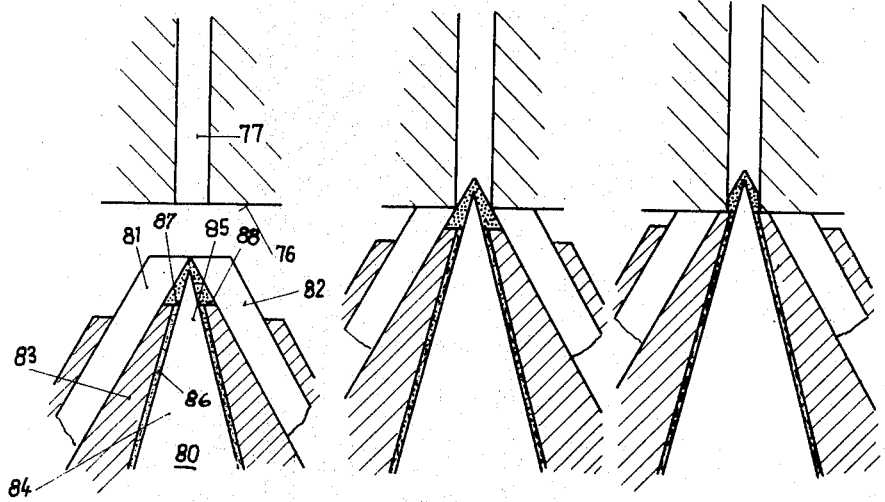

FIG. 5 shows the position of the closing device 80 prior to moving the same into the injection mold 75. The closing device 80 is in closed position.

FIG. 6 shows the position of the closing device 80 when moving in the injection mold 75. As will be seen from FIG. 6, the closing members 81 and 82 have engaged the front surface 76 of the injection mold and while the closing device 80 is moved further in the direction toward the injection mold 75, the closing members 81 and 82 are against the thrust of the springs (FIG. 4) displaced with regard to the housing part 83 so that the closing arrangement will open to an ever-increasing extent. The conveyor worm 84 has its tip 85 extending already into the injection passage 77.

FIG. 7 illustrates the condition as it prevails when the closing device 80 is completely opened, in which instance the end face 88 rests on the front face 76.

Figures 8, 9, 10:
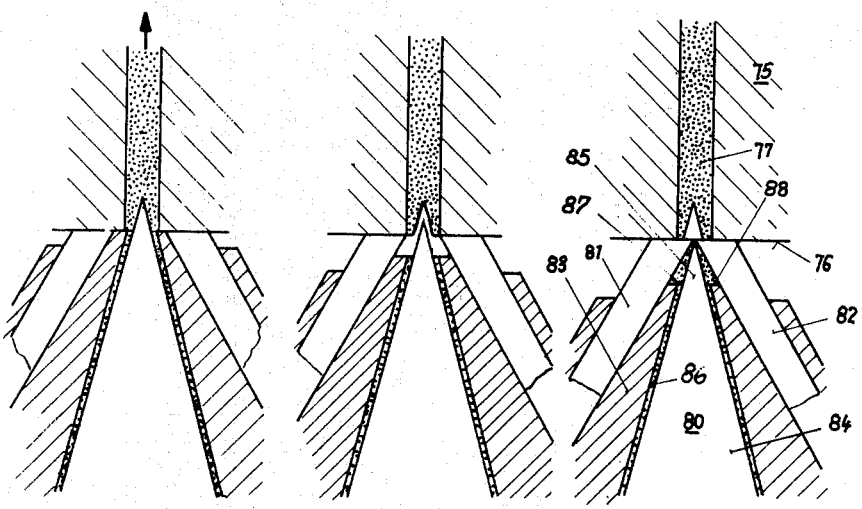

FIG. 8 illustrates how the material 86 to be injected is injected from the injection nozzle 87 into the injection passage 77.

According to FIG. 9, after the injection is finished, the injection nozzle enclosing the housing part 83 will be withdrawn, and the closing members 81 and 82 are, due to the fact that they are pressed against the front surface 76 of mold 75 by the springs, remain in engagement with the injection mold 75, so that the closing device will gradually close during the movement of the housing part 83 away from the injection mold 75. Since the injection pressure has been stopped a pyramidal shaped chamber will be filled with air.

FIG. 10 illustrates the instant at which the closing device 80, in closed condition, leaves the front surface 76 of the injection mold 75 in order in the next instant to be withdrawn into FIG. 5, i.e., the lifted-off position, the plasticising pressure fills the pyramidal shaped chamber.

FIGS. 11 to 14 illustrate a further embodiment of the invention according to which the position of the members of FIGS. 7 to 10 is shown in different phases.

An injection mold 91 has a spirally designed front portion with a front surface 92 and a calibrating or clamping ring 95 with an annular groove 93 and a door 96 and also has a mouth of an injection passage 94. A closing device 100 is equipped with closing members 101, 102 the front ends of which have a nose 103, 104, respectively. The other two closing members are not shown in these figures. The closing members 101, 102 slide in a housing part 105 with an end face 107 and a door 111 through which extends the tip 110 of a conveyor worm 106.

Figure 11:
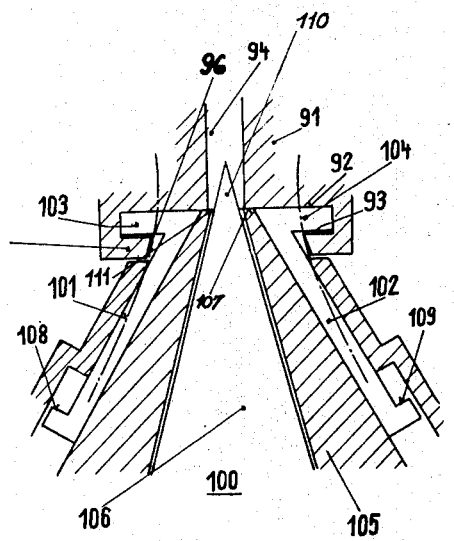

FIG. 11 shows the position of the injection mold 91 and closing device of the injection molding machine in working position. The end face 107 of the injection molding unit enclosing the housing 105, is pressed against the front face 92 of the injection mold. The closing members 101, 102 occupy their rearward position in which the noses 103, 104 engage the annular groove 93.

Figure 12:
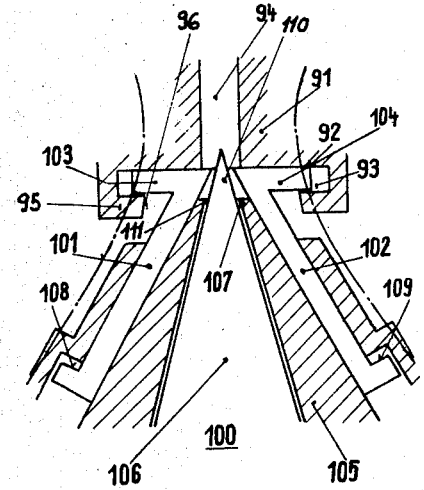
Figure 13:
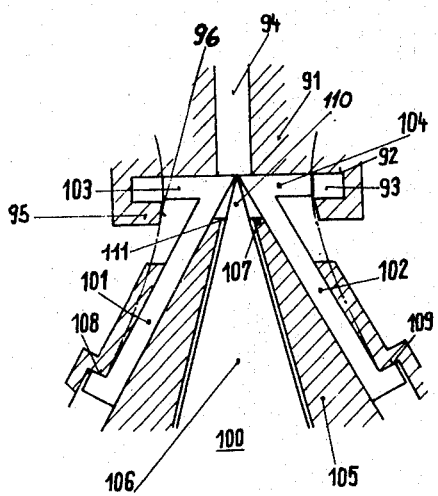
Figure 14:
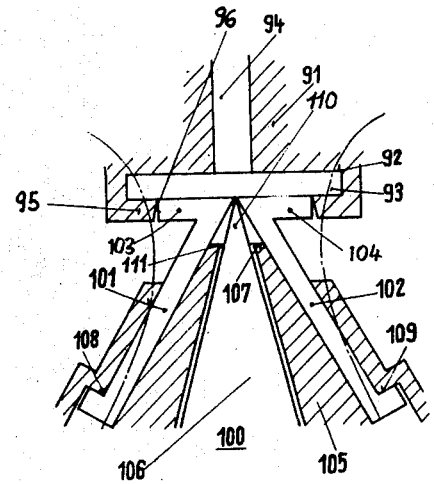

After the injection operation has been completed, the nozzle 111 enclosing the housing part 105 has been withdrawn from the injection mold 91 (FIG. 12). In this position, the closing members 101, 102 remain in contact with the front surface 92 of the injection mold 91 in view of the effect of an outer force, until said closing members 101, 102 engage the abutments 108, 109 (FIG. 13). When this occurs, the closing members 101 and 102 have reached a position in which the nozzle opening is closed. On the other hand, the noses 103, 104 have reached their minimum radial distance so that said noses, in response to a further withdrawal of the injection unit 105, are drawn into the door 96 of the calibrating or clamping ring 95, as shown in FIG. 14. This secures the closing members 101, 102 against spacing by the inner pressures.

It is, of course, to be understood that the present invention is, by no means, limited to the particular constructions shown in the drawings, but also comprises any modifications within the scope of the appended claims.

What we claim is:

1. A closing arrangement, especially for use in connection with injection molding machines, which comprises: housing means having a nozzle canal therethrough, and at least three members displaceably arranged in said housing means adjacent the discharge end of the nozzle canal and having one of their ends movable toward each other and away from each other for respectively effecting a closing operation of said nozzle canal and an opening operation of said nozzle canal, each of said members having two surfaces thereof intersecting along a straight line located so that the extensions of said straight lines substantially intersect in a point on the axis of said canal at a point therealong outside said housing, each one of said two surfaces of each of said members having a common plane with the respective adjacent surface of an adjacent member, said members being movable along said common planes in the direction toward and away from said point of intersection so as to engage each other at the last phase of said closing operation and during the first phase of said opening operation, means urging said members toward canal closing position, said members when in nozzle canal closing position projecting from said housing for operation into nozzle canal opening position by a mold moved relatively to said housing at the discharge end of said nozzle canal.

2. An arrangement according to claim 1, in which said members are of prismatic shape.

3. An arrangement according to claim 1, in which said members have a circular sector-shaped cross section.

4. An arrangement according to claim 1, in which all of said members are substantially identical.

5. A closing arrangement, especially for use in connection with injection molding machines, which comprises: housing means having a nozzle canal therethrough, a number of pairs of members displaceably arranged in said housing means and having one of their ends movable toward each other and away from each other for respectively effecting a closing of said nozzle canal and an opening of said nozzle, the members of each pair being of the same shape but being different in shape from at least another pair of members, each of said members having two surfaces thereof intersecting along a straight line located so that the extensions of said straight lines substantially intersect in a point on the axis of said canal at a point therealong outside said housing, each one of said two surfaces of each of said members having a common plane with the respective adjacent surface of an adjacent member, said members being movable along said common planes in the direction toward and away from said point of intersection so as to engage each other at the last phase of movement thereof toward canal closing position and during the first phase of movement thereof toward canal opening position, said members when in nozzle canal closing position projecting from said housing for operation into nozzle canal opening position by a mold moved relatively to said housing at the discharge end of said nozzle canal.

6. A closing arrangement, especially for use in connection with injection molding machines, which comprises: housing means having a nozzle canal therethrough, and at least three members displaceably arranged in said housing means and having one of their ends movable toward each other and away from each other for respectively effecting a closing operation of said nozzle canal and an opening operation of said nozzle canal, means continuously biasing said members in the direction for effecting said closing operation, each of said members having two surfaces thereof intersect along a straight line located so that the extensions of said straight lines substantially intersecting in a point, each one of said two surfaces of each of said members having a common plane with the respective adjacent surface of an adjacent member, said members being movable along said common planes in the direction toward and away from said point of intersection so as to engage each other at the last phase of said closing operation and during the first phase of said opening operation, said members when in nozzle canal closing position projecting from said housing for operation into nozzle canal opening position by a mold moved relatively to said housing at the discharge end of said nozzle canal.

7. An arrangement according to claim 1, which includes cooperating elements of abutment means on said members and said housing for limiting the displacement of said members in said housing.

8. An arrangement according to claim 1, in which those ends of said members which are adjacent said point of intersection are located substantially in one plane.

9. An arrangement according to claim 8, in which said members prior to completing their closing operation confine an opening with each other, and in which said members are operable in such away as to evenly reduce said opening from all sides when moving into said closing position.

10. An arrangement according to claim 1, which includes annular abutment means operable in response to said members effecting the last phase of their closing operation to concentrically radially compress those ends of said members which are adjacent said point of intersection.

References Cited by the Examiner
UNITED STATES PATENTS
2,517,571   8/1950   Janson _____ 251—212

FOREIGN PATENTS
1,097,664   1/1961   Germany.

J. SPENCER OVERHOLSER, *Primary Examiner.*

MICHAEL V. BRINDISI, *Examiner.*